UNITED STATES PATENT OFFICE.

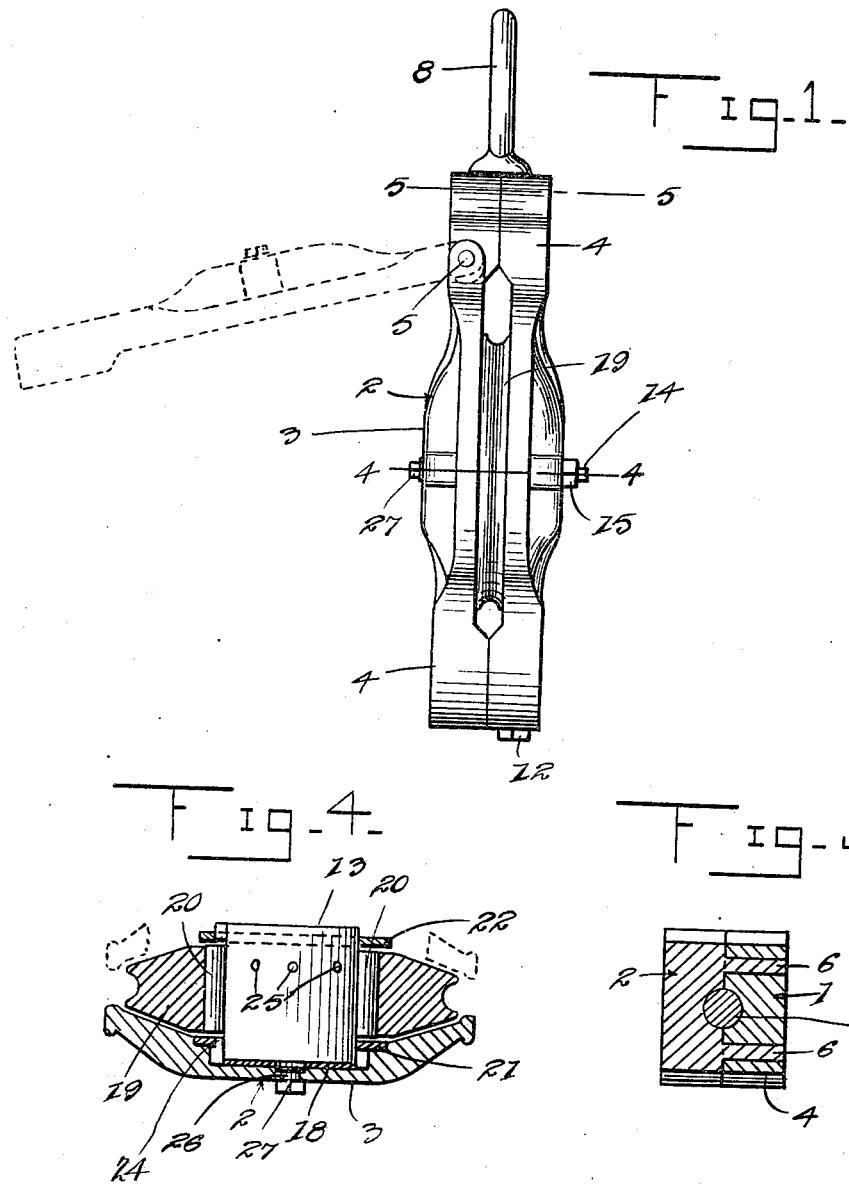

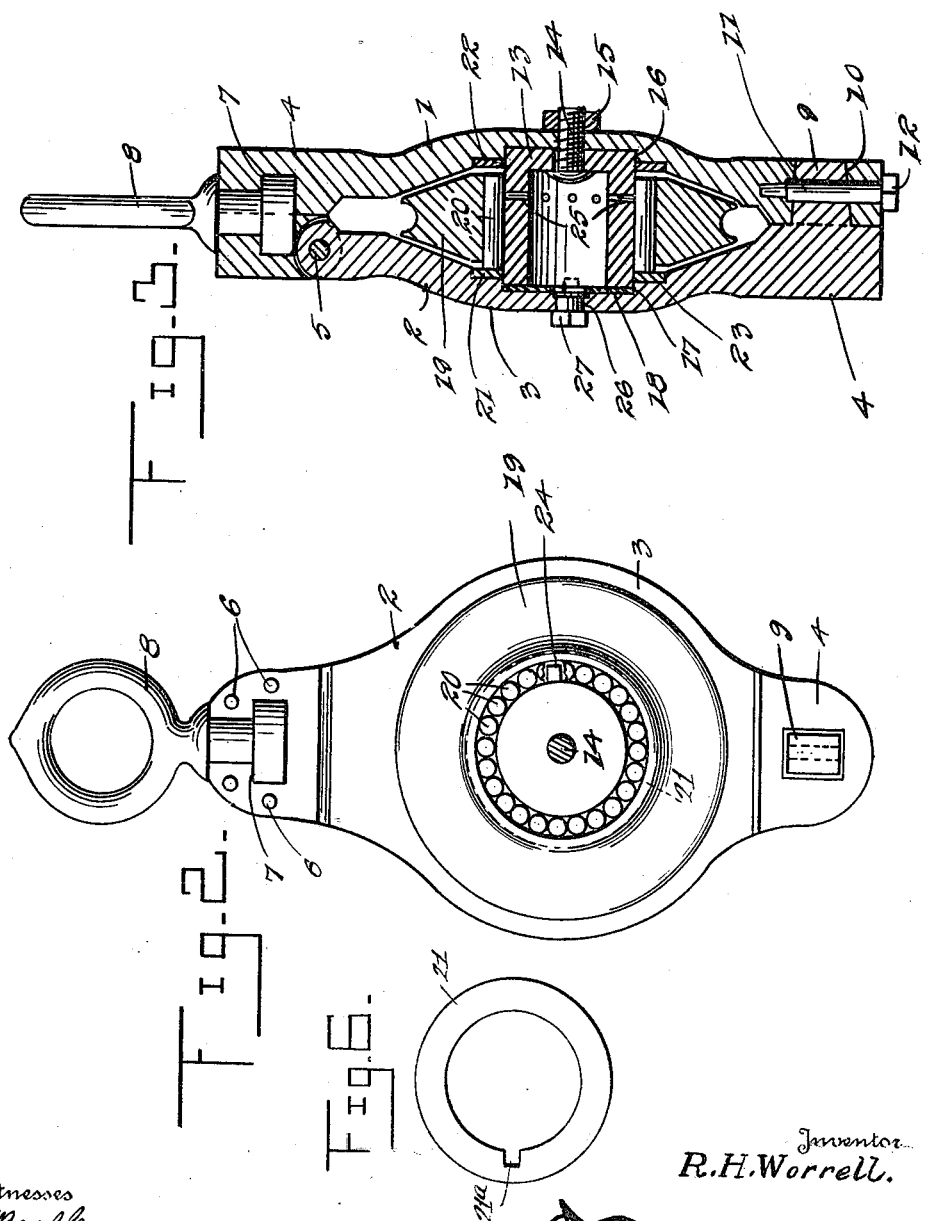

ROBERT H. WORRELL, OF SURVEYOR, WEST VIRGINIA, ASSIGNOR OF ONE-FOURTH TO JAMES H. MILLER, OF HINTON, WEST VIRGINIA, AND ONE-FOURTH TO GEORGE W. JOHNSON, OF PARKERSBURG, WEST VIRGINIA.

PULLEY-BLOCK.

1,141,745. Specification of Letters Patent. Patented June 1, 1915.

Application filed February 25, 1914. Serial No. 820,870.

*To all whom it may concern:*

Be it known that I, ROBERT H. WORRELL, a citizen of the United States, residing at Surveyor, in the county of Raleigh and State of West Virginia, have invented certain new and useful Improvements in Pulley-Blocks; and I do hereby declare the following to be a full, clear, and exact description of the invention, such as will enable others skilled in the art to which it appertains to make and use the same.

My invention relates to certain new and useful improvements in pulley blocks and resides in the provision of a pulley block which is capable of withstanding rough usage, is lubricated in a novel manner and constructed novelly and cheaply.

My pulley block may be adopted for various uses but is particularly designed for use in connection with lumbering camps. In lumbering camps the pulley is used for dragging the logs and runs continuously, and in this way is subjected to hard and rough usage, the pulleys often becoming deranged or broken because of overheated bearings.

An important object of my invention is to provide a pulley block wherein a lubricant will be automatically fed to the bearings and thus prevent overheating thereof.

Another important object of my invention is to provide a simply constructed, light and durable pulley block which is assembled in such a way as to prevent accidental derangement and insure a reliable operation.

My invention further aims to improve pulley blocks so as to render them more practical, reliable and efficient in operation, cheap to manufacture and more commercially desirable.

The above and additional objects are accomplished by such means as are illustrated in the accompanying drawings, described in the following specification and then more particularly pointed out in the claims which are appended hereto and form a part of this application.

With reference to the drawings, wherein I have illustrated the preferred embodiment of my invention as it is reduced to practice, and throughout the several views of which similar reference numerals designate corresponding parts: Figure 1 is a side elevation of my improved pulley block showing the hinged side of the block in open position, in dotted lines, Fig. 2 is a front elevation showing my device in assembled position, Fig. 3 is a vertical sectional view taken centrally through the pulley block, Fig. 4 is a horizontal sectional view taken on line 4—4 of Fig. 1, Fig. 5 is a horizontal sectional view taken on line 5—5 of Fig. 1, and Fig. 6 is a plan view of one of the bearing rings removed.

Referring to the drawings, the numerals 1 and 2 designate the side plates of the block. Each of these plates is provided with a cancavo convex approximately circular body portion 3, so that the plates when fitted together form a space sufficiently to journal the sheave to be later described. The body portion 3 of the plates are provided upon opposite sides with extension portions 4. The plate 2 is hinged as at 5 at a point approximately centrally of the ends of one of its extension portions 4 and at the outer end of the extension portion is secured to the outer end of the opposite extension portion of the plate 1 by means of bolts or other suitable fastening means 6. It will thus be seen that the plate 2 may be swung into open position with relation to the plate 1 and sheave carried thereby and to be later more fully described.

Swiveled as at 7 between the extensions 4 of the plates at the side thereof adjacent to the hinge 5 is a securing ring or eye 8 of the usual type employed.

The extension portion 4 on the plate 2 opposite to the one having the hinge 5 therein is provided with a lateral locking lug or tongue 9 that is arranged to fit within an opening 10 in the opposite portion 4 of the plate 1. The tongue or lug 9 is apertured, said aperture being adapted to aline with openings formed upon opposite sides of the opening 10. A locking pin 11 having a head 12 is inserted through the openings upon the opposite side of the opening 10 in the portion 4 of the plate 1 and the opening in the tongue 9 to hold the tongue and plates in locked position as clearly shown in Fig. 3 in the drawings. It will thus be seen that the block may be securely locked in closed position or expeditiously unlocked.

A hollow bearing pin having one end closed and designated 13 as an entirety is carried by the plate 1 centrally of the body portion 3 thereof. A securing bolt 14 is inserted through the central portion of the closed end of the bearing pin 13 and central portion of the body portion 3 of the plate 1. The unheaded screw threaded terminal of the bolt 14 is extended beyond the outer surface of the body portion 3 of the plate 1 and has turned thereon a suitable nut 15. The closed end of the pin 13 is adapted to fit within a shallow circular recess 16 formed centrally of the inner face of the body portion 3 of the plate 1.

The body 3 of the plate 2 constitutes a removable closure for the open end of the bearing pin 13 and is formed with a central recess 17 in which the open end of said pin is removably seated. A circular washer plate 18 is positioned within the recess 17 and is engaged with the open end of the pin 13 to prevent the escape of the lubricant contained therein. A sheave 19 is rotatably mounted upon the pin 13 and a plurality of bearing rollers 20 are interposed between the sheave and the pin 13 to reduce friction.

I provide bearing retaining rings 21 and 22 that surround the pin 13 and engage the ends of the bearings 20. These rings 21 and 22 serve to prevent accidental displacement of the bearing 20 and may be replaced from time to time as the movable parts of the pulley wear. The rings fit within enlarged circular portions 23 of the recesses 16 and 17 and are provided with recesses 21ª receiving the keys 24 formed at the opposite ends of the pin 13 for locking the rings against rotation.

It will be readily seen that the pin 13 in being hollow provides a compartment in which suitable lubricant may be contained. A plurality of openings 25 are formed in the pin 13 and serve to enable the lubricant to flow to the bearings 20.

As a means for filling the hollow bearing pin 13 with lubricant I provide an opening 26 formed through the central portion of the body portion 3 of the plate 2. This opening 26 communicates with a central opening in the washer plate 18. If desired, waste may be placed within the pin 13 and the lubricant may be poured into the pin 13 through the opening 26 described. A closure cap 27 is turned into the opening 26 to prevent the lubricant from running out of the pin 13. The washer plate 18 prevents unnecessary waste of the lubricant through leakage at the open end of the pin 13.

It will be readily seen that the bearings 20 will be lubricated at all times and a hot box is prevented.

It will be readily seen with reference to the foregoing description and accompanying drawings that I have provided a simple and inexpensive pulley block which is capable of performing all the functions hereinbefore recited in a reliable and expeditious manner.

The construction embodied in my pulley block enables the device to withstand rough and continual usage without possibility of accidental derangement.

In reduction to practice, I have found that the form of my invention, illustrated in the drawings and referred to in the above description, as the preferred embodiment, is the most efficient and practical, yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

What is claimed is:—

A pulley block comprising a pair of side plates hingedly secured together and having central circular recesses surrounded by annular grooves, a hollow cylindrical bearing pin having one end open, means securing the closed end of said bearing pin in the recess in one of said side plates, the opposite open end of said bearing pin being removably seated in the recess in the other side plate, a washer plate interposed between the open end of said bearing pin and the adjacent side plate, keys formed adjacent the opposite ends of said bearing pin, said bearing pin having a plurality of radial openings therethrough, a pair of annular bearing members seated in said annular grooves and having recesses therein receiving said keys, a sheave rotatably mounted upon said bearing pin, and a plurality of bearing rollers interposed between said sheave and said pin and between the annular bearing members of the pair.

In testimony whereof I affix my signature in presence of two witnesses.

ROBERT H. WORRELL.

Witnesses:
W. H. RARDIN,
J. LUIE COOK.

Copies of this patent may be obtained for five cents each, by addressing the "Commissioner of Patents, Washington, D. C."